(12) United States Patent
Bertuol Porto et al.

(10) Patent No.: US 11,872,100 B2
(45) Date of Patent: Jan. 16, 2024

(54) PINCERS FOR THE EXTRACTION OF TEETH AND RESIDUAL DENTAL ROOTS

(71) Applicant: SIT EVOLUÇÃO E TECNOLOGIA LTDA., Puerto Alegre (BR)

(72) Inventors: Joaquim Francisco Bertuol Porto, Porto Alegre (BR); Douglas Laufer Schmidt, Porto Alegre (BR); Ricardo Alberto Heine, São Leopoldo (BR); André Schaan Casagrande, Porto Alegre (BR)

(73) Assignee: SIT EVOLUÇÃO E TECNOLOGIA LTDA., Puerto Alegre (BR)

( * ) Notice: Subject to any disclaimer, the term of this patent is extended or adjusted under 35 U.S.C. 154(b) by 0 days.

(21) Appl. No.: 17/536,827

(22) Filed: Nov. 29, 2021

(65) Prior Publication Data

US 2022/0160463 A1 May 26, 2022

Related U.S. Application Data (63) Continuation of application No. 16/112,954, filed on Aug. 27, 2018, now abandoned, which is a
(Continued)

(51) Int. Cl.
*A61C 3/14* (2006.01)
(52) U.S. Cl.
CPC ..................................... *A61C 3/14* (2013.01)
(58) Field of Classification Search
CPC .............. A61C 3/14; A61C 3/16; A61C 3/162
See application file for complete search history.

(56) References Cited

U.S. PATENT DOCUMENTS

| 4,443,196 A | 4/1984 | Rico |
| 5,368,481 A | 11/1994 | Hill |

(Continued)

FOREIGN PATENT DOCUMENTS

| BR | 10 2012 018107-0 A2 | 9/2014 |
| CN | 2187050 Y | 1/1995 |

(Continued)

OTHER PUBLICATIONS

International Search Report and Written Opinion of the International Search Authority dated Apr. 26, 2017 of corresponding International application No. PCT/BR2017/000017; 9 pgs.
(Continued)

*Primary Examiner* — Cris L. Rodriguez
*Assistant Examiner* — Drew S Folgmann
(74) *Attorney, Agent, or Firm* — Maier & Maier, PLLC (57) ABSTRACT

Pincers for removing residual dental roots by the application of a contrary force on the mandible and maxilla on a pre-fixed screw. It is constructed in such a manner as to enable the strength of the operator to be multiplied and the final movement of the pincers to be reduced. The operator will need to apply minimal force and thus the procedure becomes simple and safe, thereby preserving the underlying bone structure and facilitating implant osseointegration. Likewise the device can be easily sterilized and assembled/dismantled easily because of the small number of moving parts. Further, there is no need for the mouth to be opened so widely, which results in less movement and less trauma caused by excessive opening of the patient's mouth, and it adapts to the irregular profile of support on the dental arch.

8 Claims, 6 Drawing Sheets

Related U.S. Application Data continuation of application No. PCT/BR2017/000017, filed on Feb. 21, 2017.

(56) References Cited

U.S. PATENT DOCUMENTS

| | | |
|---|---|---|
| 6,921,263 B1 | 7/2005 | Horan |
| 7,435,087 B2 | 10/2008 | Syfrig |
| 9,345,554 B1 * | 5/2016 | Mallette ............... A61C 8/0089 |

FOREIGN PATENT DOCUMENTS

| | | |
|---|---|---|
| DE | 10 2010 013 759 A1 | 12/2010 |
| KR | 20140102802 A | 8/2014 |
| WO | 2010/139459 A1 | 12/2010 |
| WO | 2011/134035 A1 | 11/2011 |

OTHER PUBLICATIONS

Non-Final Office Action dated Oct. 23, 2019 in parent U.S. Appl. No. 16/112,954.

* cited by examiner

PINCERS FOR THE EXTRACTION OF TEETH AND RESIDUAL DENTAL ROOTS

FIELD

The present patent application for Pincers for the Extraction of Teeth and Residual Dental Roots includes exemplary embodiments related to a pair of pincers for removal of remaining dental roots by application of counter force on the mandible and maxilla on a previously fixed screw. It is applicable in the area of health, in dentistry.

BACKGROUND

The object is derived from Patent Application BR 20 2016 027654 9, which defends the exclusivity of a dental instrument similar to a pair of pincers with two socket joints, having a recess at its distal end for engaging a pin, screw or other convenient element, previously inserted in the tooth or in the remaining root of the tooth to be extracted. Said pincer was constructed with two socket joints so as to multiply the force of the operator (preferably a dentist) and allow only the minimum force to be used, thus reducing the final displacement of the pincers and eliminating the risk of accidents due to excessive force displacement, the process is simple and safe. Said patent can be easily sanitized, like any other instrument used by dentists, also because it refers to pincers of simple construction. The present patent application provides as innovation its geometry, more anatomical and with springs and latches that make its use more comfortable for the operator, with added safety of the operation. It also provides as an improvement a mechanical leveling system for adjustment of the instrument to the existing unevenness in the dental arch, for example between the molar teeth and the canine teeth or between the canine teeth and the incisive teeth.

Nowadays, several traditional techniques are used, such as forceps, or keys with a screw-like tip, which are inserted in the roots and then the dentist can pull them out. These, however, require a greater effort on the part of the user, in addition to which equal force is attributed to the patient in the opposite direction, causing a juxtaposition in the bone structure and a consequent inflammatory process, which causes notorious discomfort. It may even lead to collateral traumas such as swelling in the area and even possible fractures difficult to correct in maxillary and mandible bones. As a general rule, the more traumatic the procedure, the longer the postoperative recovery. If the removal of the roots is carried out in order to replace the removed tooth with a prosthesis on the implant, the occurrence of an inflammatory process or fracture in the mandible and maxilla bones will cause delays in all the procedures as well as possible osteointegration problems in the implant, of both functional and aesthetic nature. Another problem is the discomfort for the user caused by the poor anatomical design of some tools available in the market. This factor is worrisome because it reduces the usability of the instrument, which is reflected in the poor control of the procedure, increasing the occurrence of damages and traumas, as well as repetitive strain injuries (RSI) in the operator. Another possibility of accident is due to the fact that the current tools disregard the irregularities and characteristic unevenness of the dental arch, a factor that can cause damages to the teeth used as support for these tools.

An apparatus for easy extraction is described in U.S. Pat. No. 7,435,087 B2, which removes the screws previously placed in the roots, using the tensile force of the extractor which, through a system of steel handle and pulley is fixed in the screw and by a spindle system is able to transmit a torsional force on the spindle that pulls the steel handle, which in turn is attached to the head of the screw inserted in the tooth or root. Not only does this apparatus require attention in sterilization, but it is also large, full of moving parts, and exhibits difficulties of operation for posterior teeth.

Patent DE 10 2010 013 759 A1 discloses a three-component patch for the same purpose, in which one of the components serves as a support for removal of the root by the other two components. However, such a device has a high opening angle, and greater complexity of operation and assembly.

Another patent, BR 10 2012 018107-0 A2, specifies a special screw for this purpose, removed by a simple spatula that acts as a lever, transferring the force of extraction to a single point in the dentition, increasing the risk of collateral fractures.

The apparatus disclosed in WO 2011/134035 A1 discloses a tool similar to a pair of pincers with an opening angle perpendicular to the axis of the tooth for complete tooth extraction using a tool holder to aid removal; however, operation and sterilization are complex, and this apparatus cannot be used for the removal of roots. In addition to these there are some other apparatuses in the market, which are, however, not that used.

SUMMARY

Therefore, the solution disclosed herein as well as the innovation disclosed above in BR 20 2016 027654 9, solves problems arising from the force to be applied in the extraction of the remaining root, can be used in the extraction of whole or injured teeth and remaining roots of teeth, and aims to reduce the manual force required for the extraction, now added to the usability increased by the latch and spring system, as well as by the anatomical format, factors that reduce the risk of accidents and bone fractures, with an impact on reducing patient discomfort, and preservation of the underlying bone structure that facilitates the osseointegration of implants. The modifications proposed here keeps the sizes reduced and a reduced opening angle of the mouth, with less movement and less trauma due to excessive opening of the patient's mouth. The operation remains simplified, requiring only prior attachment of the screw in the tooth or root and, secondly, the pincers are applied directly. This simplicity is also reflected in the ease of sterilization.

BRIEF DESCRIPTION OF THE FIGURES

In order to facilitate the research to provide an understanding of the present patent, as recommended in the specification, according to a basic and preferred embodiment prepared by the Applicant, reference is made to the attached drawings, which integrates and subsidizes this specification.

DETAILED DESCRIPTION

With reference to the attached figures, one can note that exemplary embodiments can include a bi-socket jointed system formed by the components: handle 10, central body 2, pincer 3 and feet 5, which engage through shafts 7 on which they rotate, and are protected by a cover 1. The pincer 3 is the base part of said pincers, capable of, at one end, engaging the pulling screw previously fixed in the remaining tooth/root, where the main force component which results in the extraction of said remaining tooth/root acts. In other words, the pincer 3 can form a part of an extractor that fits over a screw that is already fixed in the tooth and/or root. Pincer 3 can then function to perform a traction movement that promotes the extraction of the tooth.

The feet 5 rest on the adjacent teeth or gum with a function of distributing the efforts on the teeth where they will effectively support the equipment and have independent adjustment and latching to ensure the support according to the unevenness of the dental arch or the need for support in gum as well as coating of soft material, the rubbers 6 of the feet 5.

The operation of the Pincers for the Extraction of Teeth and Residual Dental Roots begins by fitting the pincer 3 on the extractor screw and adjusting the height of the feet 5 in the surrounding support area. This adjustment is made by pressing the feet 5 downward, the position being maintained by the action of the front spring 8 and the latch 4 which in turn regulates the position of the pincers for the extraction, varying if there is or not the presence of other teeth around the tooth to be extracted. As each foot-latch assembly actuates independently from each other, each side can have a different height, causing the pincer action to occur close to the screw shaft, facilitating extraction and reducing pain and the risk of injury to the mandible or maxilla. The actuation of the pincers does not cause unlatching, being a result of the traction of the handle 10 in the direction opposite to extraction, causing the latch to loosen and allowing the repositioning of the feet 5 in the original position.

To actuate the present object, the dental surgeon holds the pincers in one hand, resting the cover 1 in the palm of the hand and applying the force on the handle 10 with the fingers. The resulting force is amplified in the proximal socket joint of the central body 2 and transmitted to the distal socket joint by movement of the handle 10 relative to the central body 2. The bending of the distal socket joint amplifies the force received actuating in the raising movement of the pincer 3 on the feet 5, which results in the extraction of the remaining tooth/root where the extractor screw is fixed. The back spring 9 ensures the return of the handle 10 to the initial position.

Figure 1:
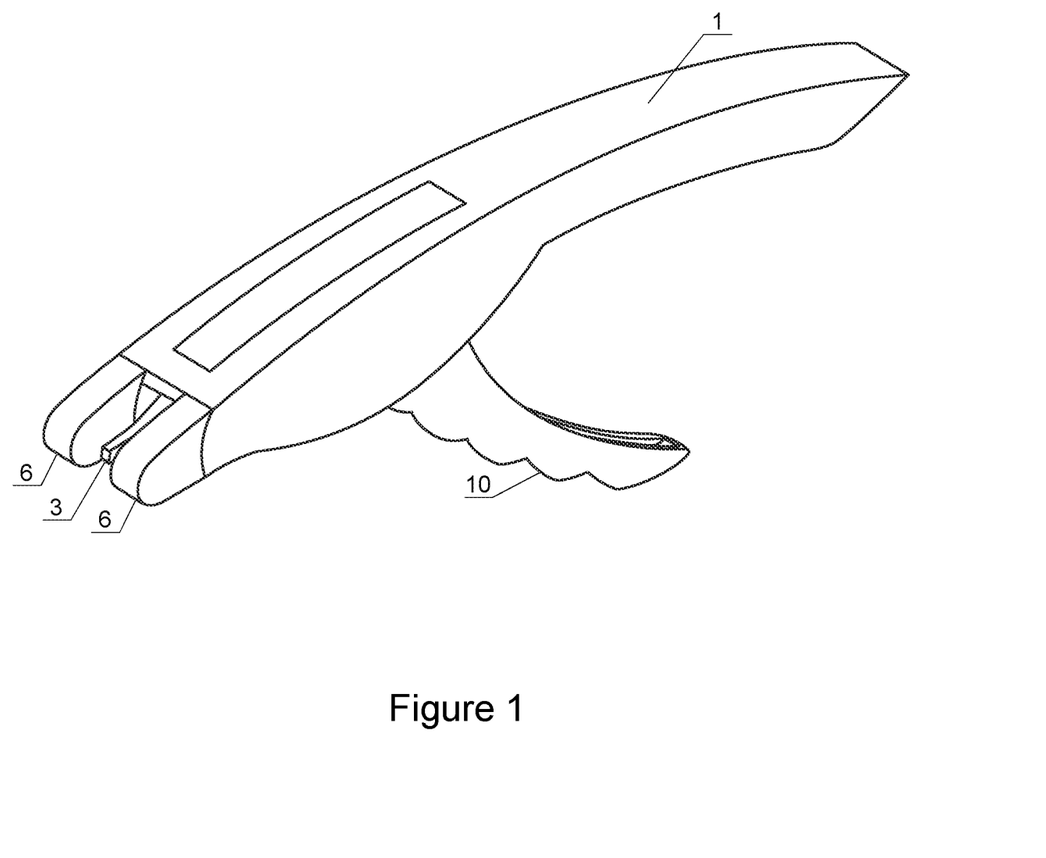
FIG. 1—It shows the Pincers for the Extraction of Teeth and Residual Dental Roots in an isometric view that enhances its anatomical shape, showing the cover 1 that protects the central body 2 and the drive and latching mechanism, from whose lower portion projects part of the handle 10 which controls its activation and reposition the feet 5, the rubbers 6 of the feet 5 between which once can see the pincer 3.
Figure 2:
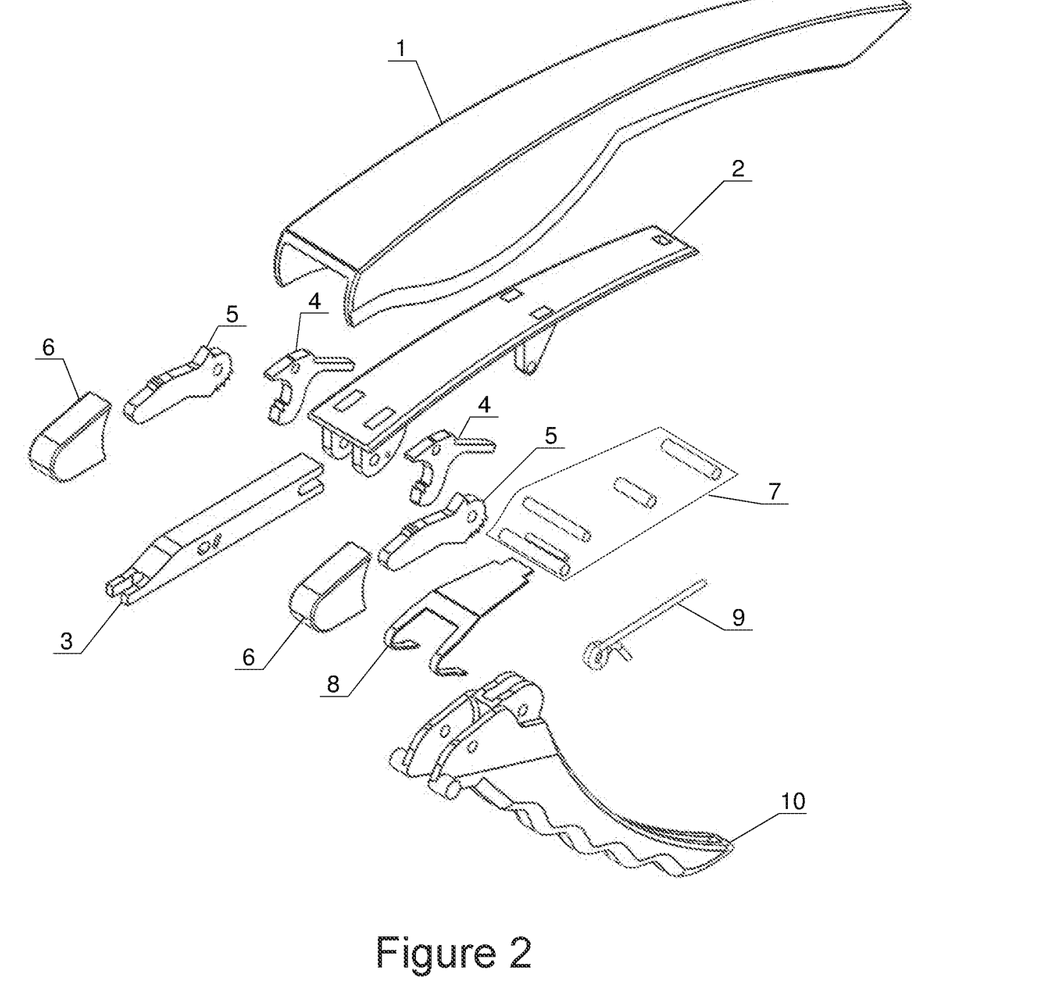
FIG. 2—It shows the exploded isometric view of the Pincers for the Extraction of Teeth and Residual Dental Roots, where all the components and the bi-socket jointed system formed between the handle 10, the central body 2, the pincer 3, and the feet 5.
Figure 3A:
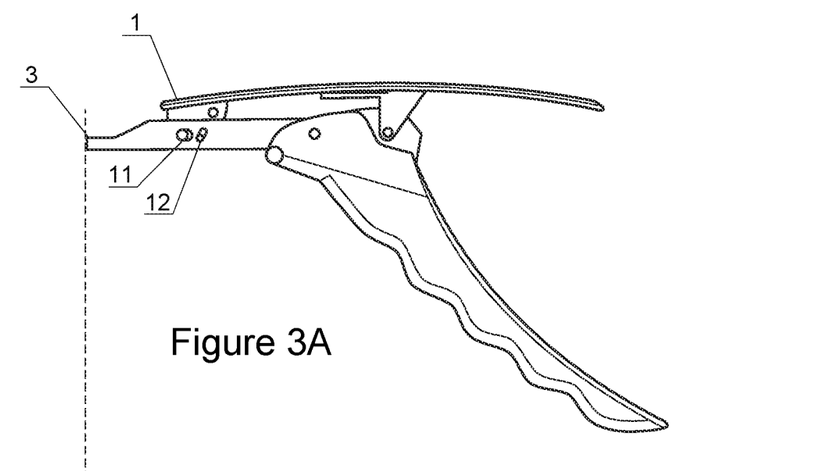
FIG. 3A—an exemplary diagram showing fitting members on a pincer.
Figure 3B:
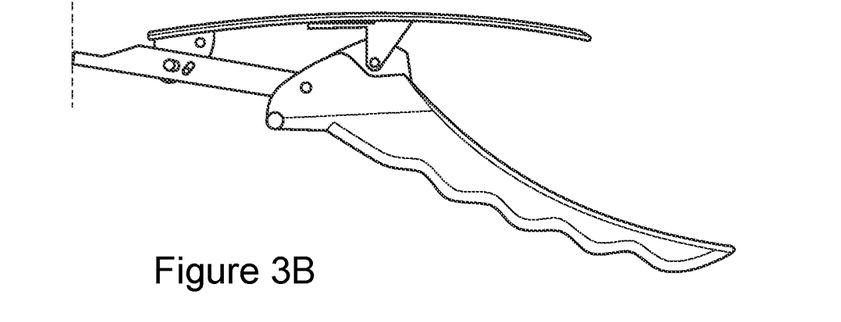
FIG. 3B—another exemplary diagram showing fitting members on a pincer.

Referring now to FIGS. 3A and 3B, another exemplary embodiment may be shown and described. In these views, pincer 3 can be shown having oblong hole 11 and oblong hole 12. Oblong hole 11 may have a greater radius than oblong hole 12.

In FIGS. 3A and 3B, the handle 10 can be connected to the pincer 3 by a shaft. When making a tightening movement on the handle 10, pincer 3 can be moved upwards, which performs the traction movement on the screw (shown below as element 18).

Further, the handle 10 is connected to the pincer 3 by a shaft; when making a tightening movement on the handle 10, it will move the pincer 3 up, performing the traction movement on the screw. As shown in FIGS. 3A and 3B, the pincer has 2 oblong holes, oblong hole 11 and oblong hole 12, where each has different radii. For example, as noted above, oblong hole 11 may have a greater radius than oblong hole 12. Oblong holes 11 and 12 can have the function of allowing the pincering axes of the pincer 3 to move, avoiding a horizontal movement of pincer 3 by tightening the handle 10 to move the pincer 3, because such a movement would cause a flexion in the screw. Therefore, by achieving the restriction of this horizontal displacement of the pincer 3, there is only the tensile stress on the screw, which is the desired objective.

Figure 4A:
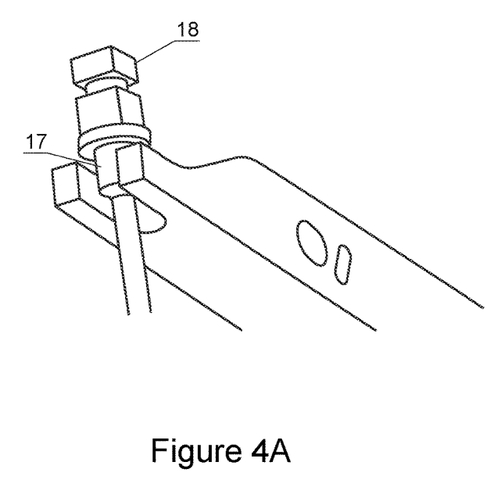
FIG. 4A—an exemplary diagram showing fitting of a screw in a pincer.
Figure 4B:
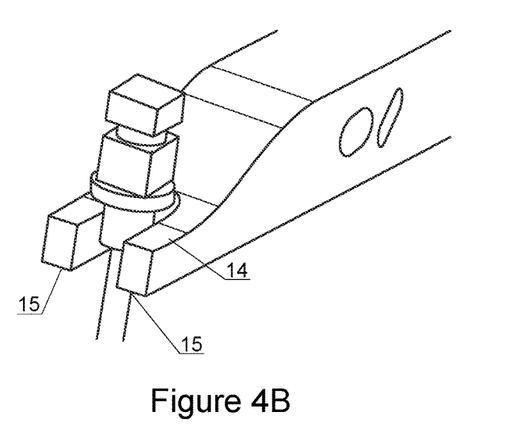
FIG. 4B—another exemplary diagram showing fitting of a screw in a pincer.
Figure 4C:
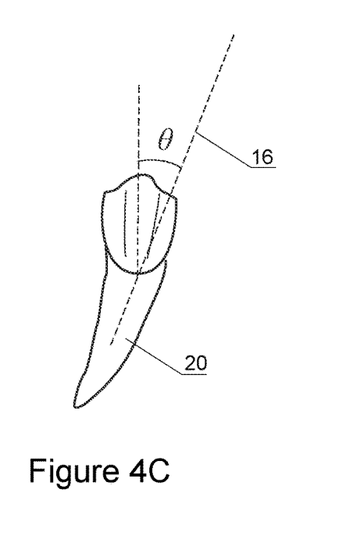
FIG. 4C—an exemplary diagram of a tooth and root axis in a tooth demonstrating a desired extraction angle.
Figure 4D:
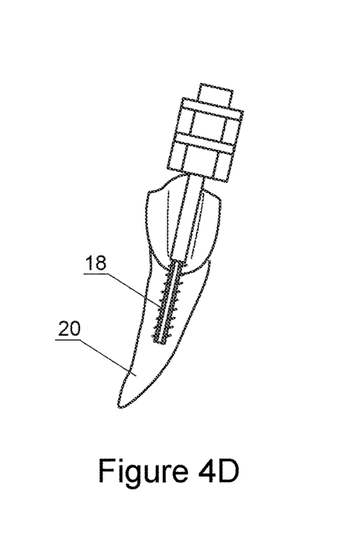
FIG. 4D—an exemplary diagram of a screw inside a tooth positioned for extraction.

Referring now to exemplary FIGS. 4A-C, further embodiments may be shown related to how the screw 18 can be fitted to the pincer 3. In some examples, screw 18 can be placed in the direction 16 of the root 16 of tooth 20. A pincer rip 14 fits with the pincer base 15 such that the pincer rip 14 can be fitted in such a way that the base 17 of the screw 18 is perpendicular to the axis of the screw 18.

Figure 5A:
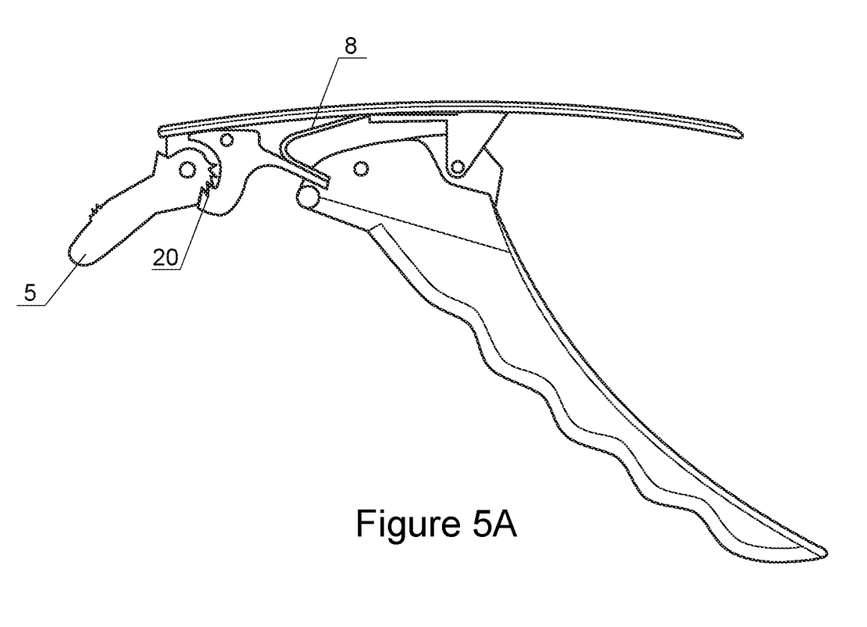
FIG. 5A—an exemplary diagram showing a latch and latching elements on a foot where the foot is in a first position.
Figure 5B:
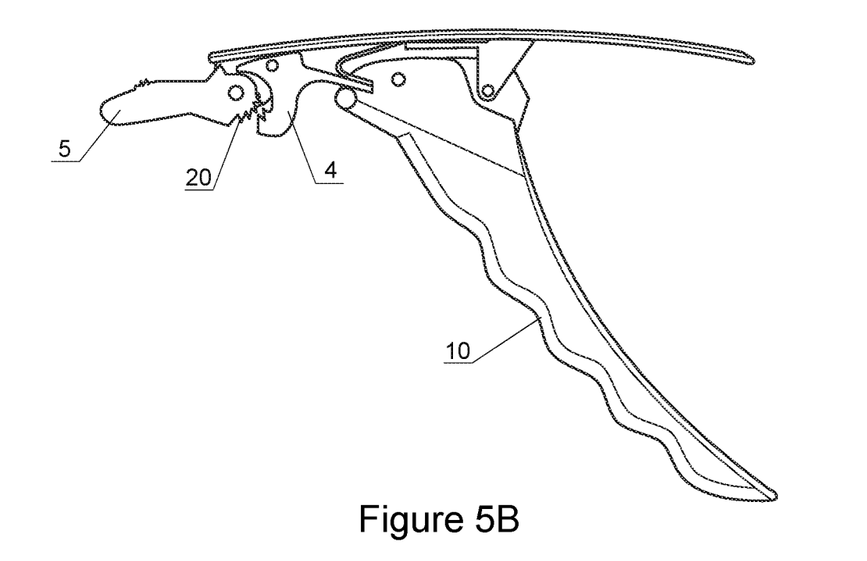
FIG. 5B—an exemplary diagram showing a latch and latching elements of a foot where the foot is in a second position.

Referring now to exemplary FIGS. 5A-B, support feet 5 may have teeth 20 disposed thereon. Teeth 20 may be fitted to latch 4. This can allow for adjustments of 3 or more different positions for the feet 5, for example, by pressing down on support feet 5. Further, teeth 20 can allow for each foot 5 to be adjusted independently to provide any desired fit.

Further in some exemplary embodiments, feet 5 can be returned to a starting position, as desired, to provide for horizontal alignment of each foot 5. To return each foot 5 to a starting position, a user may activate the handle 10 with one hand by pulling the handle 10 forward. This movement action can cause the protrusion 19 of the handle 10 to press a bottom portion of latch 4. Latch 4 may then disengage from foot 5 and allow for movement of each foot 5 to an initial position, for example, by use of a thumb of the hand of the user that is pulling the handle 10.

In a further exemplary embodiment, after each foot 5 is in a starting position, the handle 10 can be released. The protrusion 19 of the handle 10 can then move downward and the front spring 8 can press the bottom of the latch 4 down. As a result, the latch 4 will fit foot 5, causing foot 5 to be fixed again.

Figure 6A:
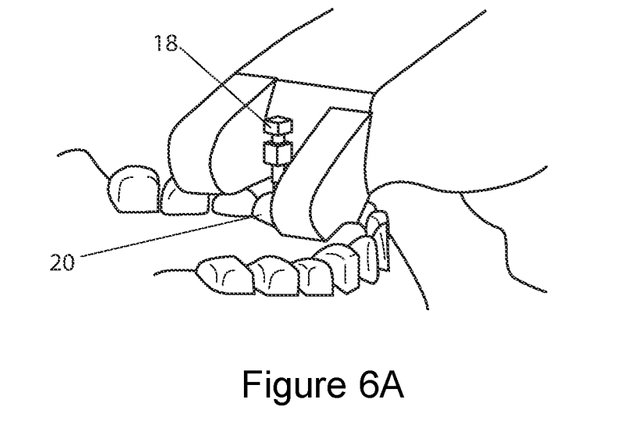
FIG. 6A—an exemplary diagram showing pincers on the tooth of a user.
Figure 6B:
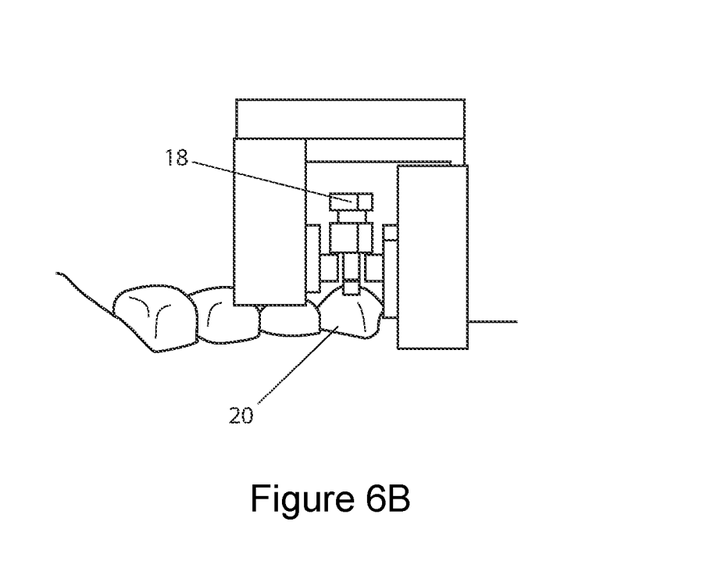
FIG. 6B—another exemplary diagram showing pincers on the tooth of a user.

Referring now to FIGS. 6A and 6B, further exemplary embodiments showing an extraction device and screw 18 may be seen as set in a tooth 20.

The handle of the Pincers for the Extraction of Teeth and Residual Dental Roots is anatomical, and its design is universal and can be operated with equal efficiency by both hands.

The invention claimed is:

1. A bi-socket jointed system for removal of dental roots comprising:
    a handle, configured to be held by fingers of a dental surgeon;
    a central body, wherein the handle is configured to move relative to the central body;
    a pincer, connected to the handle by a shaft, wherein the pincer is configured to engage a screw previously fixed in a dental root and perform a traction movement to extract the dental root;
    support feet, configured to rest on at least one of teeth adjacent to the dental root or gum adjacent to the dental root, wherein adjustment of the support feet regulates a position of the pincer during the traction movement to extract the dental root; and
    a front spring configured to press a latch into the support feet, thereby fixing a position of the support feet during the traction movement to extract the dental root.

2. The bi-socket jointed system of claim 1, further comprising:
    a back spring configured to return the handle to an original position after the traction movement to extract the dental root.

3. The bi-socket jointed system of claim 1, wherein the pincer further comprises:
    a first oblong hole; and
    a second oblong hole, wherein the first oblong hole has a greater radius than the second oblong hole.

4. The bi-socket jointed system of claim 1, wherein the pincer further comprises:
    a pincer base; and
    a pincer rip, wherein the pincer rip is configured to fit with the pincer base while the pincer engages the screw to have a base of the screw perpendicular to an axis of the screw defined by the engagement of the pincer with the screw.

5. The bi-socket jointed system of claim 1, wherein pressing the latch into the support feet involves engagement of teeth on the support feet with the latch.

6. The bi-socket jointed system of claim 5, wherein the teeth on the support feet are configured to adjust the support feet into at least three different positions.

7. The bi-socket jointed system of claim 1, wherein the handle further comprises a protrusion that is configured to press a bottom portion of the latch.

8. The bi-socket jointed system of claim 7, wherein a downward movement of the protrusion is configured to press the front spring into the bottom portion of the latch.

* * * * *